United States Patent
Isayama et al.

(10) Patent No.: US 8,360,463 B2
(45) Date of Patent: Jan. 29, 2013

(54) ENGAGEMENT STRUCTURE

(75) Inventors: Hiroyuki Isayama, Wako (JP); Koji Ikeda, Wako (JP); Hiroyuki Hirayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/271,431

(22) Filed: Oct. 12, 2011

(65) Prior Publication Data
US 2012/0112440 A1 May 10, 2012

(30) Foreign Application Priority Data
Nov. 8, 2010 (JP) ................................. 2010-249983

(51) Int. Cl.
*B60R 21/20* (2006.01)
(52) U.S. Cl. ................................. 280/728.3
(58) Field of Classification Search .............. 280/728.3, 280/728.2; 296/187.05, 187.11, 187.12, 296/193.06
See application file for complete search history.

(56) References Cited

U.S. PATENT DOCUMENTS

| | | | |
|---|---|---|---|
| 6,296,269 B1 * | 10/2001 | Nagai et al. .............. | 280/728.2 |
| 6,431,584 B1 * | 8/2002 | Nagasawa et al. ......... | 280/728.2 |
| RE38,125 E * | 5/2003 | Shibata et al. ............. | 280/730.2 |
| 6,874,809 B1 * | 4/2005 | Walter et al. ............... | 280/728.3 |
| 7,025,377 B2 * | 4/2006 | Ryu ........................... | 280/730.2 |
| 7,445,233 B2 * | 11/2008 | McKimson ................ | 280/730.2 |
| 7,581,749 B2 * | 9/2009 | Robins ....................... | 280/728.2 |
| 7,654,558 B2 * | 2/2010 | Choi .......................... | 280/728.2 |
| 7,690,676 B2 * | 4/2010 | Jaramillo et al. .......... | 280/728.2 |
| 7,841,619 B2 * | 11/2010 | Miyamoto et al. ........ | 280/728.3 |
| 7,931,295 B2 * | 4/2011 | Inui et al. .................. | 280/730.2 |
| 7,934,746 B2 * | 5/2011 | Glaser et al. .............. | 280/728.3 |
| 2002/0167152 A1 * | 11/2002 | Preisler et al. ............ | 280/728.3 |
| 2007/0080524 A1 * | 4/2007 | Kim .......................... | 280/730.2 |

FOREIGN PATENT DOCUMENTS
JP 2005-007935 1/2005

* cited by examiner

*Primary Examiner* — Faye M. Fleming
(74) *Attorney, Agent, or Firm* — Ditthavong Mori & Steiner, P.C.

(57) ABSTRACT

An engagement structure includes a garnish main body, a garnish lid, an engagement stop, and an engaged part. The engagement stop has an engagement protrusion and is disposed on one of the garnish main body and the garnish lid. The engagement protrusion protrudes in a direction opposite to an airbag accommodated between the pillar and the garnish main body. The engaged part is engaged to the engagement protrusion and is disposed on another of the garnish main body and the garnish lid. The engaged part has a guiding surface configured to guide the airbag during inflation.

8 Claims, 7 Drawing Sheets

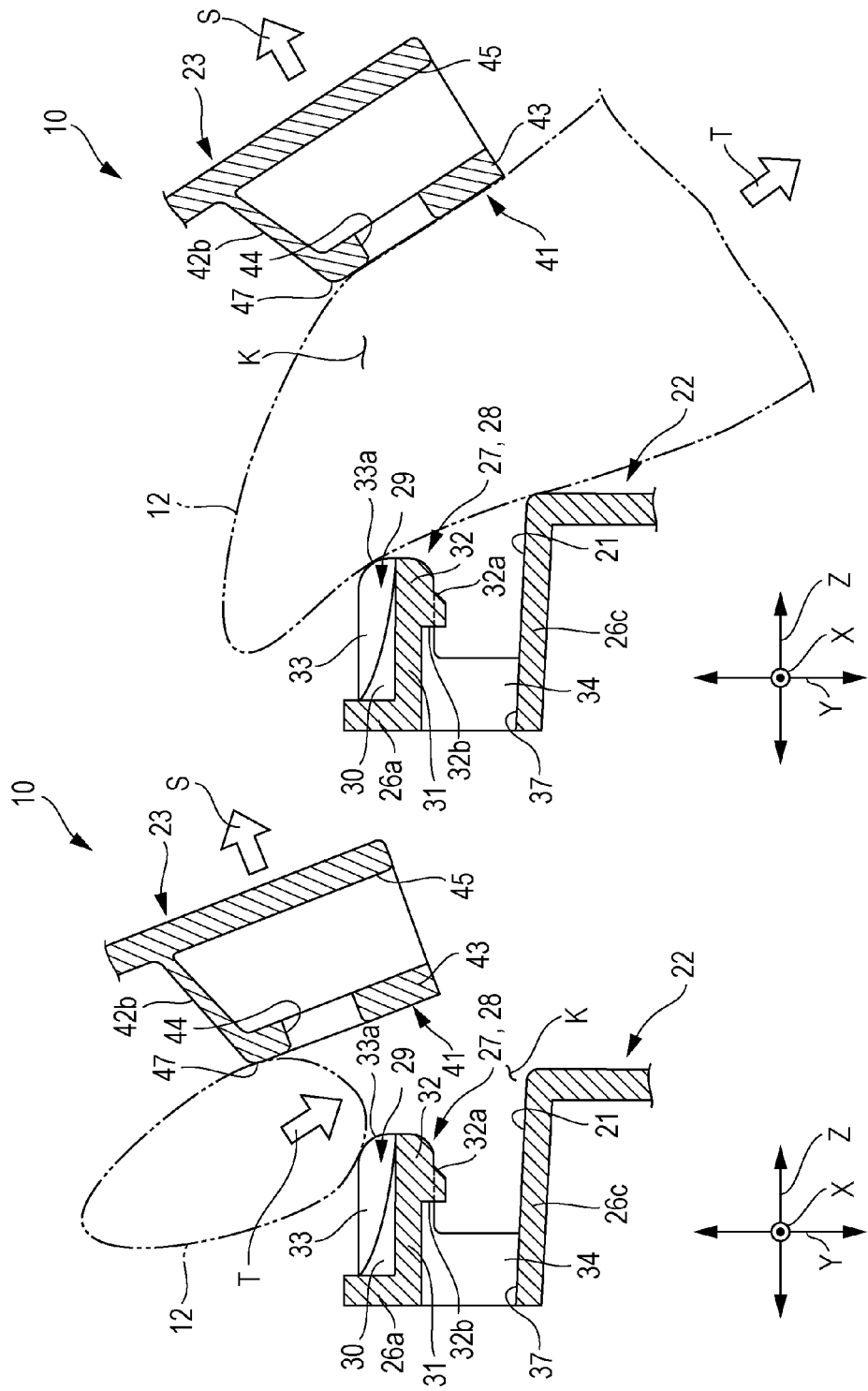

ENGAGEMENT STRUCTURE

CROSS-REFERENCE TO RELATED APPLICATIONS

The present application claims priority under 35 U.S.C. §119 to Japanese Patent Application No. 2010-249983 filed Nov. 8, 2010. The contents of this application are incorporated herein by reference in their entirety.

BACKGROUND OF THE INVENTION

1. Field of the Invention

The present invention relates to an engagement structure.

2. Discussion of the Background

There are known side curtain airbags which are inflated between the vehicle sidewall and a passenger when impact is received during a side collision or roll-over of a vehicle.

Such a side curtain airbag is folded and accommodated between a pillar and a pillar garnish and is inflated into the vehicle interior by high-pressure gas ejected from an inflator upon receiving impact.

The side curtain airbag disclosed in Japanese Unexamined Patent Application Publication No. 2005-7935 is configured to secure an end section of a pillar garnish to a side edge of a pillar with a clip and is detachable by sliding a clip attachment provided on the end section of the pillar garnish in the inflation direction of the airbag with respect to the clip. With such a configuration, the clip attachment slides in the inflation direction of the airbag and detaches from the clip when the airbag is inflated; thus, the pillar garnish and the pillar move apart to form space therebetween, allowing the airbag to inflate into the vehicle interior through the space.

SUMMARY OF THE INVENTION

According to one aspect of the present invention, an engagement structure includes a garnish main body, a garnish lid, an engagement stop, and an engaged part. The garnish main body is attached to a pillar of a vehicle on a vehicle interior side and has a notch at an inflation position of an airbag of a curtain airbag apparatus accommodated between the pillar and the garnish main body. The garnish lid is attached to the garnish main body to cover the notch and to be pushed out into a vehicle interior to form an opening between the garnish main body and the garnish lid by being pushed out into a vehicle interior when the airbag inflates. The engagement stop has an engagement protrusion and is disposed on one of the garnish main body and the garnish lid. The engagement protrusion protrudes in a direction opposite to the airbag accommodated between the pillar and the garnish main body. The engaged part is engaged to the engagement protrusion and is disposed on another of the garnish main body and the garnish lid. The engaged part has a guiding surface configured to guide the airbag during inflation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 7A and 7B correspond to FIG. 5 and illustrate an inflating airbag.

DESCRIPTION OF THE EMBODIMENTS

Figure 1:
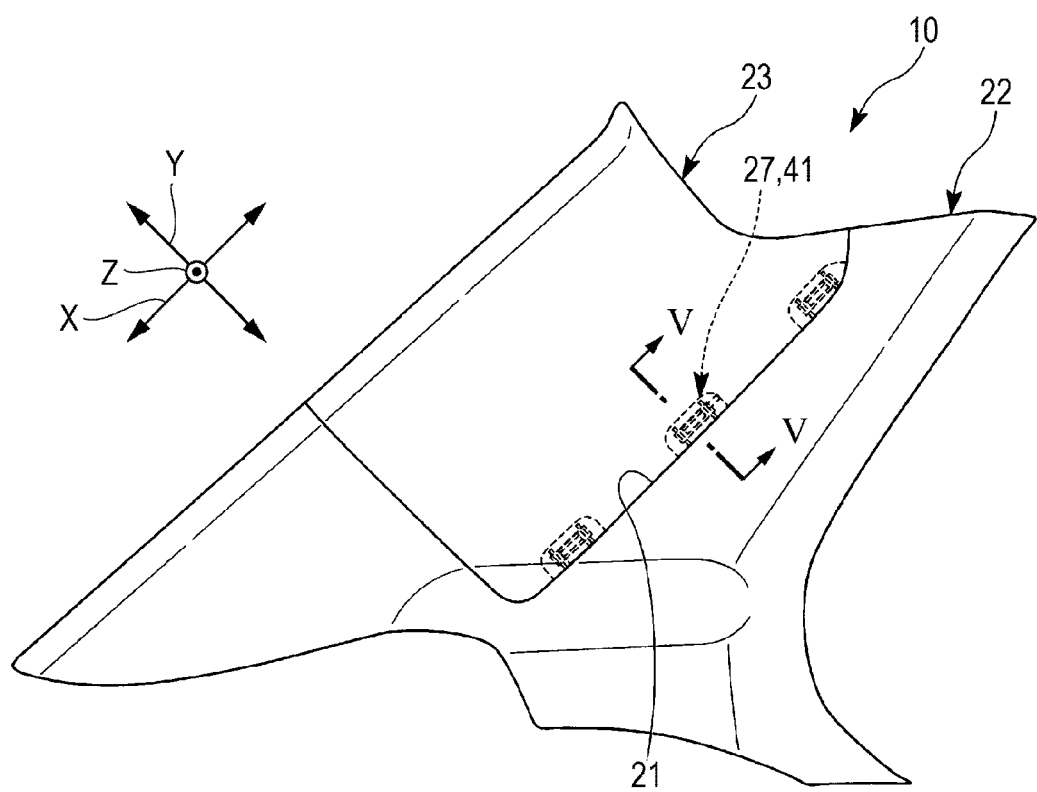
FIG. 1 is a plan view of a rear pillar garnish according to an embodiment of the present invention.

An embodiment of the present invention provides an engagement structure including a garnish main body (for example, a main body 22 according to an embodiment) attached to a pillar in a vehicle on the vehicle interior side and having a notch (for example, a notch 21 according to an embodiment) at an inflation position of an airbag (for example, an airbag 12 according to an embodiment) of a curtain airbag apparatus accommodated between the pillar and the garnish main body; and a garnish lid (for example, a garnish lid 23 according to an embodiment) attached to the garnish main body so as to cover the notch and constituting an opening (for example, an opening K according to an embodiment) between the garnish main body and the garnish lid by being pushed out into the vehicle interior when the airbag inflates, wherein an engagement stop (for example, an engagement stop 28 according to an embodiment) having an engagement protrusion (for example, an engagement protrusion 32 according to an embodiment) is disposed on one of the garnish main body and the garnish lid, an engaged part (for example, an engaged part 41 according to an embodiment) engaged to the engagement protrusion is disposed on the other one of the garnish main body and the garnish lid, the engagement protrusion protrudes in a direction opposite to the airbag, and the engaged part has a guiding surface (for example, a sidewall part 42b according to an embodiment) configured to guide the airbag during inflation.

According to the embodiment of the present invention, the airbag starts inflating when high-pressure gas is supplied thereto from an inflator upon receiving impact in a side collision or a roll-over. The inflation pressure of the airbag acts upon the garnish lid, causing the garnish lid to be pushed into the vehicle interior. As a result, the engaged part and the engagement stop are disengaged. Consequently, the garnish lid and the garnish main body are detached from each other, and the garnish main body and the garnish lid are separated to form a space therebetween, allowing the airbag to inflate through the opening into the vehicle interior.

At this time, since the airbag inflates toward the opening as it slides along the guiding surface of the engaged part, the airbag and the engaged part are less likely to interfere with each other. Since the engagement protrusion of the engagement stop protrudes in a direction opposite to the airbag, the airbag and the engagement stop are less likely to interfere with each other. Accordingly, the airbag can be smoothly inflated through the opening between the garnish main body and the garnish lid into the vehicle interior, and thus, damage of the airbag can be prevented.

According to an embodiment of the present invention, a sidewall part (for example, a longitudinal wall 33 according to an embodiment) may be disposed on the engagement stop in a direction orthogonal to the inflation direction of the airbag, and the end surface of the sidewall part may be constituted of a curved surface (for example, a curved surface 33a according to an embodiment).

According to the embodiment of the present invention, since the airbag inflates along the curved surface, interference between the airbag and the tip of the engagement stop is prevented, enabling the airbag to inflate more smoothly.

According to an embodiment of the present invention, a rib (for example, a rib 30 according to an embodiment) configured to guide the airbag during inflation is disposed on a surface of the engagement stop facing the airbag.

According to the embodiment of the present invention, since a rib is disposed on a surface of the engagement stop facing the airbag, the airbag smoothly inflates without being caught by the engagement stop by inflating along the rib, even if the airbag contacts the engagement stop disposed between the sidewall parts. In this way, the airbag can be inflated even more smoothly.

The embodiments will now be described with reference to the accompanying drawings, wherein like reference numerals designate corresponding or identical elements throughout the various drawings. FIG. 1 is a plan view of a rear pillar garnish. Hereinafter, front, rear, left, and right directions correspond to those directions of the vehicle, unless otherwise stated. In FIG. 1, the right side in the drawing corresponds to the front side of the vehicle, and the left side in the drawing corresponds to the rear side of the vehicle.

As illustrated in FIG. 1, rear pillar garnishes 10 (hereinafter, referred to as pillar garnishes 10) are attached to a vehicle body (not shown) such as to cover left and right rear pillars from the vehicle interior. The upper edge of each pillar garnish 10 is connected to a roof lining (not shown) attached to the roof (not shown) from side of the vehicle interior side, and the lower edge is connected to a rear tray (not shown). A side curtain airbag 12 (see FIG. 5) is folded and accommodated between each pillar garnish 10 and each rear pillar. Since the pillar garnishes 10 have symmetrical configurations, only the left pillar garnish 10 of the left and right pillar garnishes 10 will be described in detail below.

Figure 2:
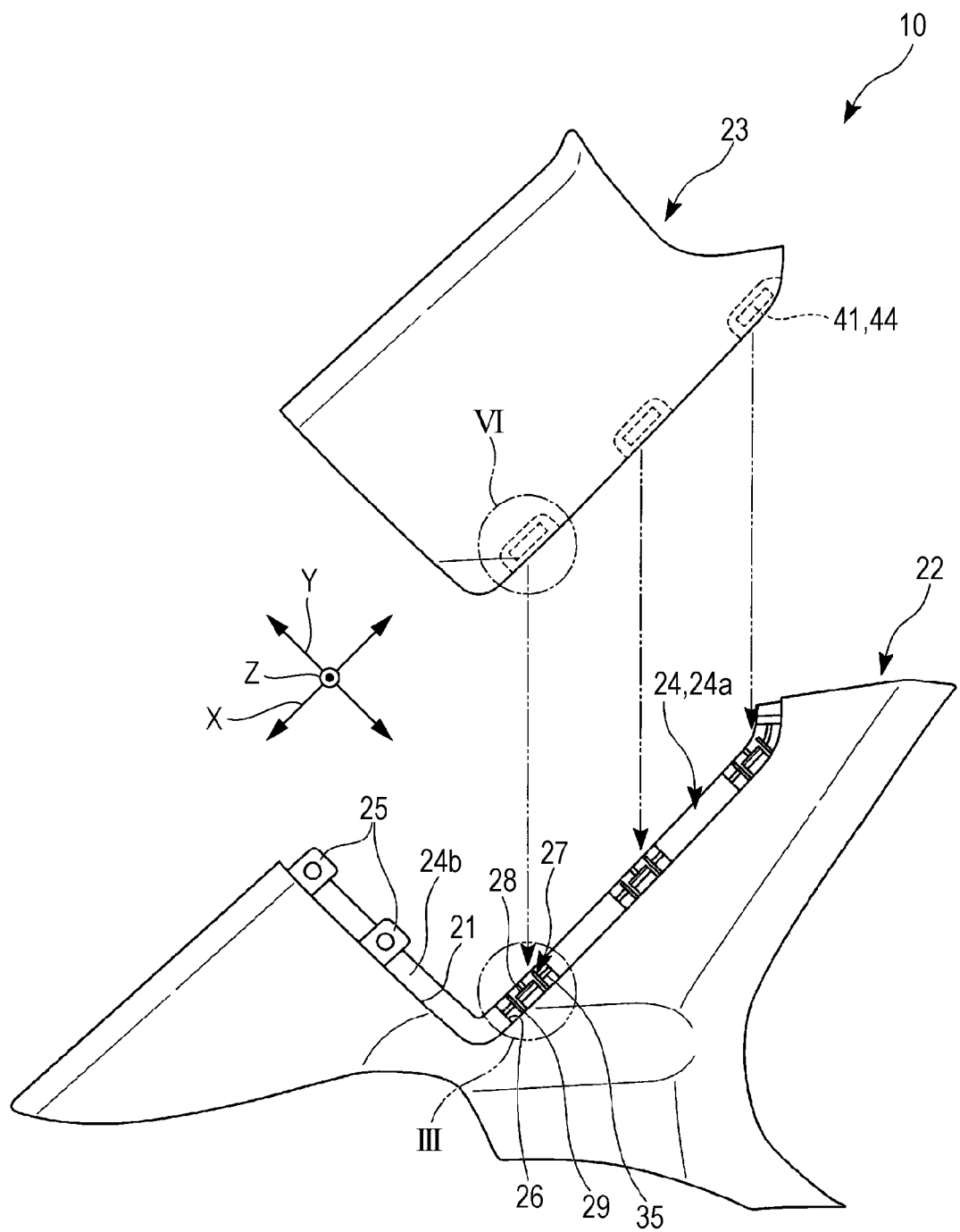
FIG. 2 is an exploded perspective view of the pillar garnish.

FIG. 2 is an exploded perspective view of the pillar garnish.

As illustrated in FIGS. 1 and 2, the pillar garnish 10 includes a main body 22 of the garnish 10, which is L-shaped in plan view and has a notch 21 at the upper edge part, extending in the lower rear direction, and a garnish lid 23, which is rectangular in plan view and attached to the main body 22 to cover the notch 21.

The edge of the opening in the notch 21 of the main body 22 has an inner flange 24. The inner flange 24 protrudes from the back surface (the surface facing outside the vehicle) of the main body 22 into the notch 21 and is depressed in the front surface (the surface facing inside the vehicle) of the main body 22 in a direction toward the outside of the vehicle. The inner flange 24 is formed along the entire edge of the opening of the notch 21 and is L-shaped in plan view. Specifically, the inner flange 24 includes a lower edge 24a extending at an angle from the upper edge of the main body 22 in the lower rear direction and a rear edge 24b extending from the lower edge of the lower edge 24a in the upper rear direction. The extending direction (longitudinal direction) of the lower edge 24a of the inner flange 24 is the X direction; the extending direction (longitudinal direction) of the rear edge 24b is the Y direction; and the thickness direction of the inner flange 24 is the Z direction.

The rear edge 24b of the inner flange 24 has a plurality of attachment pieces 25 disposed along the Y direction. The attachment pieces 25, where the rear edge of the garnish lid 23 is secured, protrude in the X direction, into the notch 21.

Figure 3:
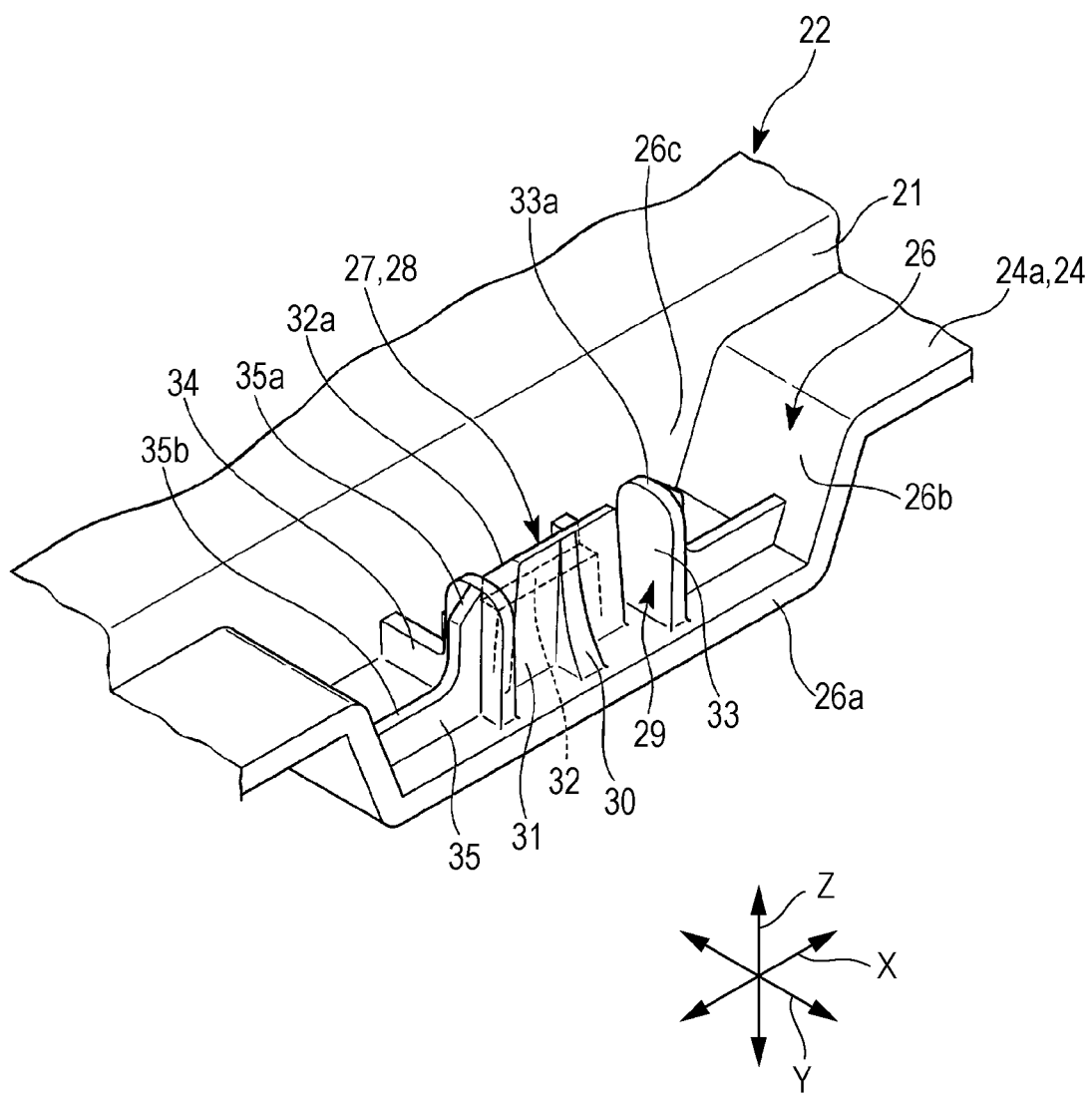
FIG. 3 is an enlarged view of section III in FIG. 2.
Figure 4:
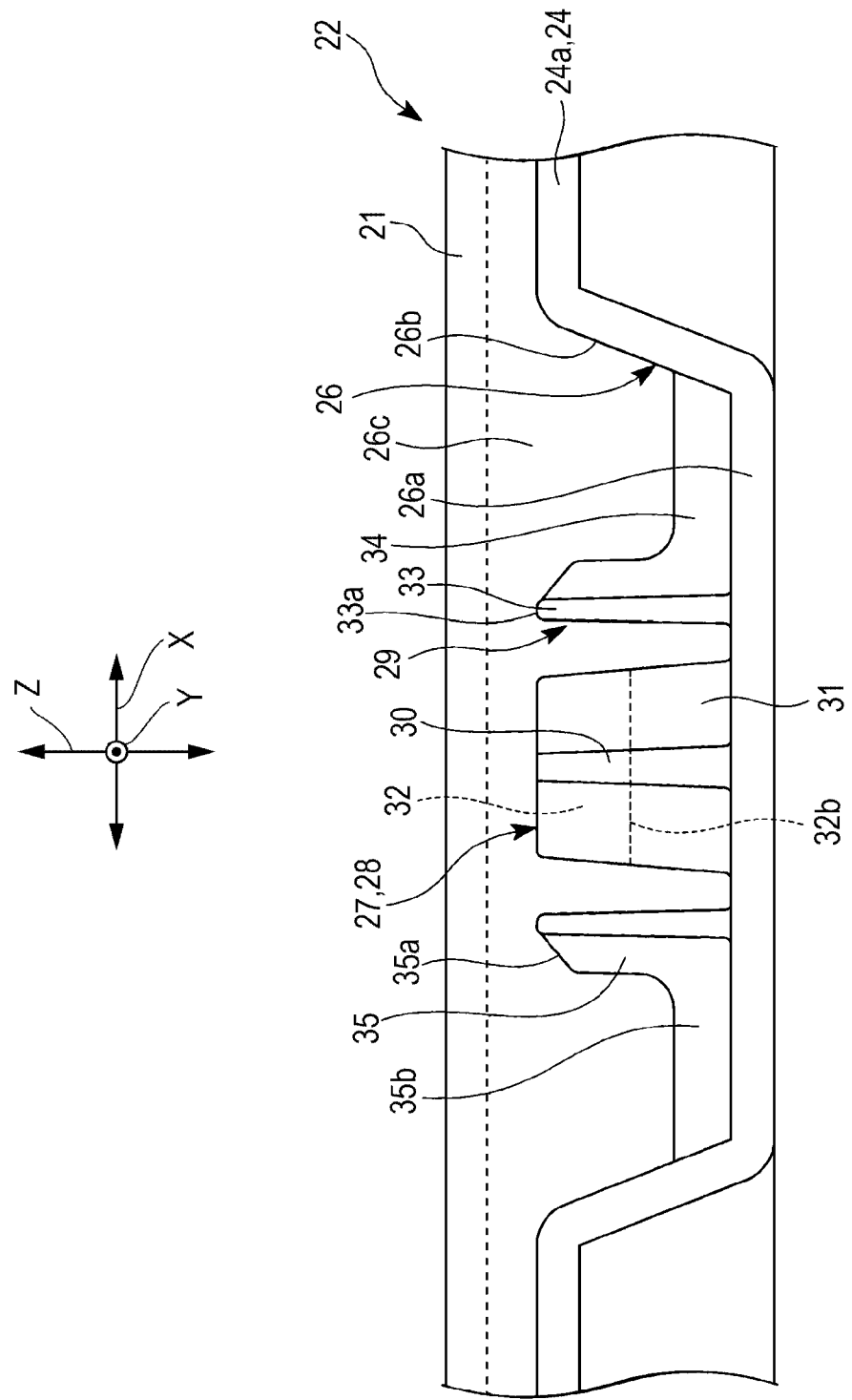
FIG. 4 is a side view of section III in FIG. 2.
Figure 5:
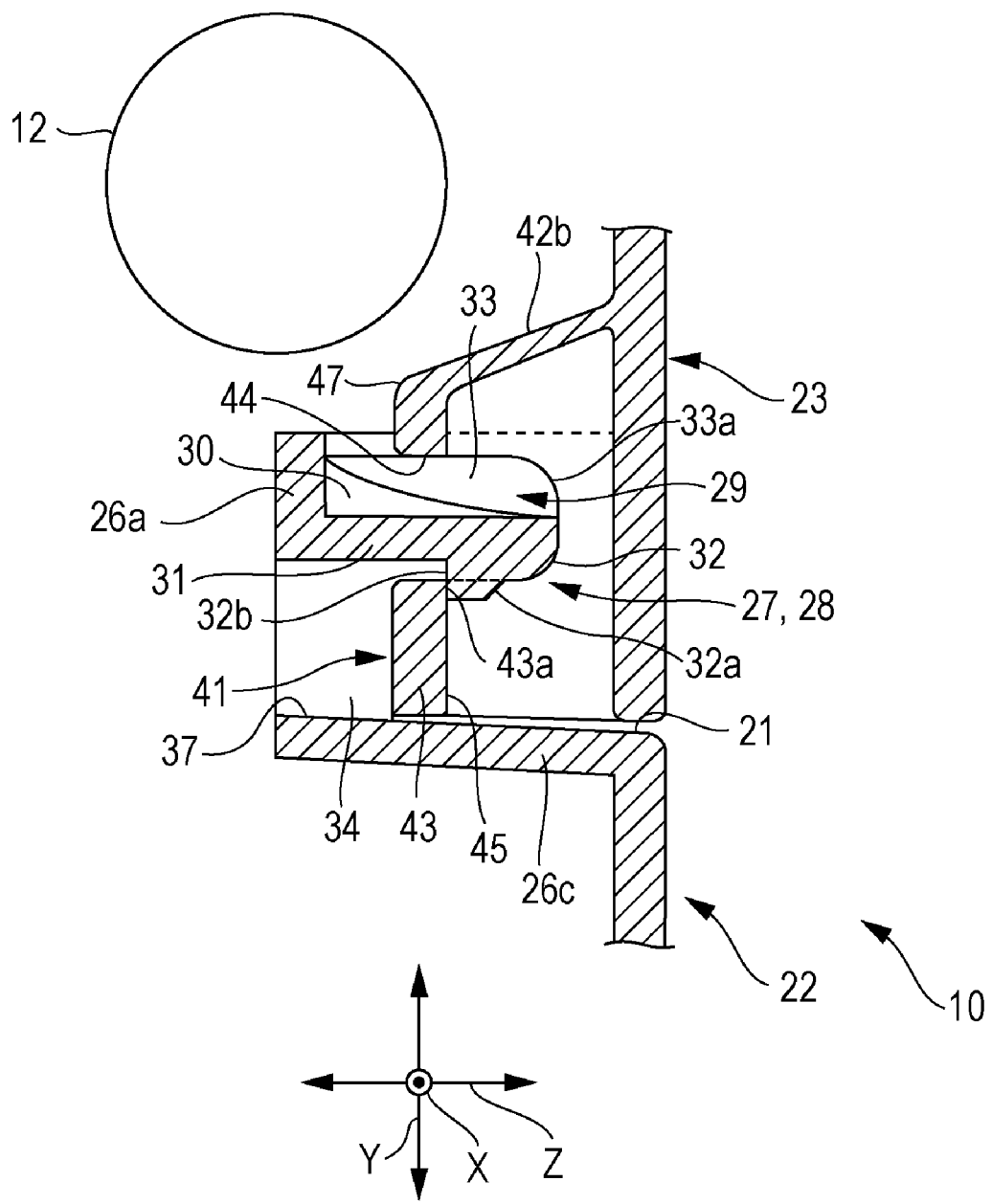
FIG. 5 is a sectional view taken along line V-V in FIG. 1.

FIG. 3 is a perspective view of section III in FIG. 2. FIG. 4 is a side view of section III. FIG. 5 is a sectional view taken along line V-V in FIG. 1.

As illustrated in FIGS. 2 to 5, the lower edge 24a of the inner flange 24 has a plurality of depressions 26 along the X direction. The depressions 26 are formed in the inner flange 24 in a direction toward the outside of the vehicle (Z direction). The width of each depression 26 gradually decreases in the X direction toward the bottom part 26a. Specifically, each depression 26 has sidewall parts 26b extending in a direction intersecting with the Z direction along both edges of the bottom part 26a intersecting with the X direction, and a lower wall part 26c extending from one of the ends in the Y direction (i.e., on the main body 22 side) of the bottom part 26a, toward the lower edge 24a. The bottom part 26a of the depression 26 has a vertically-disposed engagement part 27, which is engaged with an engaged part 41 in the garnish lid 23, which is described below. The engagement part 27 and the engaged part 41 constitute the engagement structure.

The engagement part 27 has an engagement stop 28 vertically disposed from the middle part in the X direction of the bottom part 26a, toward the inside of the vehicle (in the Z direction), and sidewall parts 29 disposed at both ends in the X direction of the engagement stop 28.

The engagement stop 28 has a flat tongue-like piece 31, whose thickness direction is the Y direction. The tongue-like piece 31 is vertically disposed toward the inside of the vehicle (in the Z direction). The tip of the tongue-like piece 31 has an engagement protrusion 32 protruding toward the lower wall part 26c (the side opposite to the airbag 12). The engagement protrusion 32 is triangular in side view and has an inclined surface 32a tapered from the base to the tip. The back surface of the inclined surface 32a is an engagement surface 32b, where the engaged part 41 is engaged, as described below.

The surface of the tongue-like piece 31 on the side opposite to the engagement protrusion 32 (the surface facing the airbag 12) has a rib 30 vertically disposed along the Z direction. The rib 30 protrudes from the middle part in the X direction of the tongue-like piece 31 toward the Y direction of the tongue-like piece 31. The length of the rib 30 in the Y direction gradually increases from the tip to the base of the tongue-like piece 31. That is, the Y-direction end surface of the rib 30 is a curved surface. The base of the rib 30 is connected to the bottom part 26a of the depression 26.

The paired sidewall parts 29 sandwich the engagement stop 28 from the X direction of the engagement stop 28 (the direction orthogonal to the inflation direction (indicated by arrows T in FIGS. 7A and 7B) of the airbag 12). The sidewall parts 29 are flat members, whose thickness direction is the X direction, and are vertically disposed parallel to each other. Specifically, each of the sidewall parts 29 has a longitudinal wall 33, which overlaps with the engagement stop 28 in the X direction, and a lateral wall 34, which extends in the Y direction from the base of the longitudinal wall 33.

The longitudinal wall 33 extends from the bottom part 26a of the depression 26 to a height equal to the that of the tongue-like piece 31 and is used for positioning in the Y direction when the main body 22 and the garnish lid 23 are engaged. The end surface of the longitudinal wall 33 has a rounded, curved surface 33a. Only the tip of the engagement protrusion 32 protrudes from the sidewall parts 29 into the Y direction when viewed in the X direction.

As illustrated in FIGS. 3 and 4, the longitudinal wall 33 has a rib 35 extending along the Z direction on the surface opposite to the engagement stop 28. The rib 35 protrudes from the longitudinal wall 33 in the direction opposite to the engagement stop 28 (in the X direction) from the middle part in the Y direction and is used for positioning in the X direction when the main body 22 and the garnish lid 23 are engaged. The tip of the rib 35 has an inclined surface 35a, which inclines in a direction intersecting with the Z direction. The base of the rib 35 has an extended part 35b, which extends in the X direction to the sidewall part 26b of the depression 26.

The lateral wall 34 is shorter than the longitudinal wall 33 in the Z direction and is used for positioning in the Z direction when the main body 22 and the garnish lid 23 are engaged. One of the ends of the lateral wall 34 in the Y direction is connected to the longitudinal wall 33, and the other end is connected to the lower wall part 26c of the depression 26. As illustrated in FIG. 5, a through-hole 37 penetrates, in the Z direction the area in the bottom part 26a of the inner flange 24, surrounded by the engagement stop 28 and the lateral walls 34.

Figure 6:
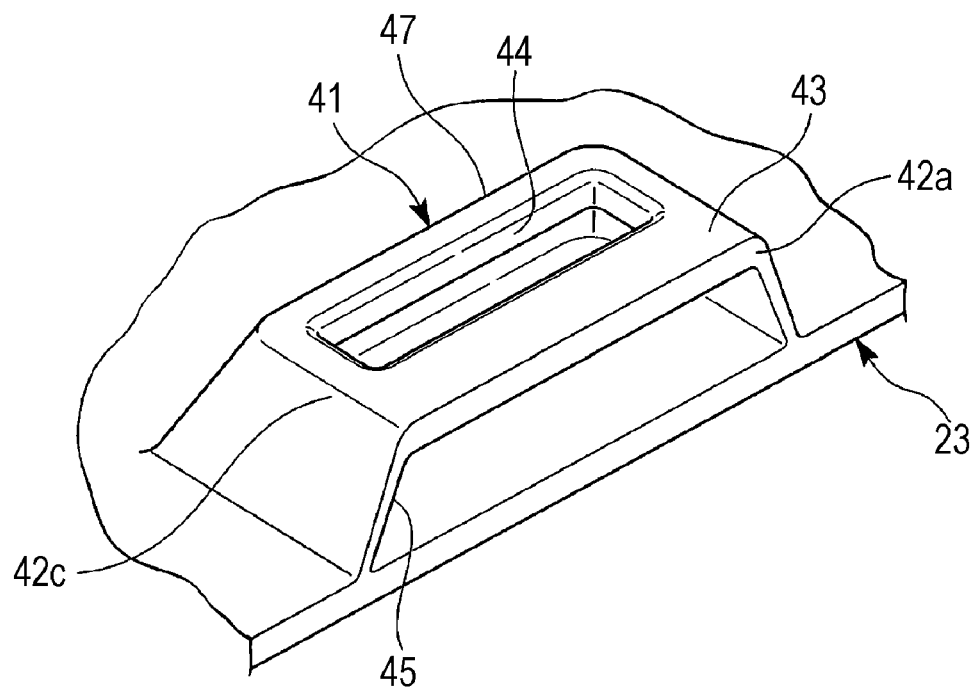
FIG. 6 is an enlarged view of section VI in FIG. 2.
Figure 6:
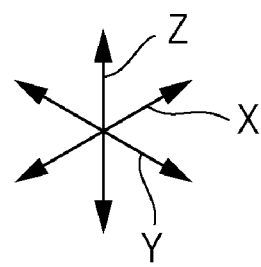

FIG. 6 is an enlarged view of section VI in FIG. 2.

As illustrated in FIGS. 5 and 6, the engaged parts 41 are disposed on the lower edge section of the garnish lid 23, along the X direction at the positions corresponding to the engagement parts 27, which have been described above. Each of the engaged parts 41 is shaped as a hollow, truncated pyramid, which protrudes in the Z direction from the back surface of the garnish lid 23 (the surface facing the outside of the vehicle). Specifically, the engaged part 41 includes three sidewall parts 42a, 42b, and 42c, which extend in directions intersecting with the Z direction, and a ceiling part 43, which is connected with the edges of the sidewall parts 42a, 42b, and 42c. Each engaged part 41 is small enough to be accommodated in each depression 26 in the main body 22, as described above. As illustrated in FIG. 5, the curtain airbag 12 is folded and stored in a space on a side of the garnish lid 23 facing the outside of the vehicle (i.e., stored between the garnish lid 23 and the rear pillar). The airbag 12 is inflated by high pressure gas supplied from inflator (not shown).

Among the three sidewall parts 42a, 42b, and 42c, the sidewall parts 42a and 42c are disposed along the X direction and are arranged such that the distance therebetween become gradually smaller from the bases to the tips.

Among the three sidewall parts 42a, 42b, and 42c, the sidewall part 42b (guiding surface) is connected to an edge of each of the sidewall parts 42a and 42c in the Y direction (on the airbag 12 side) and is tilted toward the lower edge section of the garnish lid 23 from the base to the tip. That is, the sidewall part 42b is an inclined surface that faces the airbag 12 in the Y direction and is tilted toward an inflation direction T of the airbag 12 (in a direction opposite to the airbag 12). The other edge in the Y direction of the engaged part 41 has an opening 45 opened to the lower edge section of the garnish lid 23.

The periphery of the ceiling part 43 (the boundaries of the ceiling part 43 and the sidewall parts 42a, 42b, and 42c) has a chamfered part (guiding surface) 47 on which round chamfering is provided.

The ceiling part 43 has an engagement hole 44 along the Z direction. The engagement hole 44 is rectangular shaped in which the X direction is the longitudinal direction. The engagement stop 28 is engaged with the engagement hole 44 with the engagement surface 32b of the engagement stop 28 (engagement protrusion 32) contacting the opening edge of the engagement hole 44 (engaged surface 43a) from the inside of the vehicle.

At this time, the main body 22 and the garnish lid 23 are positioned in the Z direction by making the Z-direction end surfaces of the ceiling part 43 and the lateral wall 34 of the sidewall parts 29 come into contact. That is, the engaged part 41 is engaged with the ceiling part 43 being interposed between the engagement surface 32b of the engagement part 27 and the lateral wall 34.

The main body 22 and the garnish lid 23 is positioned in the Y direction by passing the longitudinal walls 33 of the sidewall parts 29 of the engagement part 27 through the engagement hole 44 and making the Y-direction end surfaces of the longitudinal walls 33 come into contact with the inner peripheral surfaces of the engagement hole 44 in the Y direction.

The main body 22 and the garnish lid 23 are positioned in the X direction by making the ribs 35 of the longitudinal walls 33 come into contact with the inner peripheral surfaces of the engagement hole 44 in the X direction.

In this way, the notch 21 inside which the airbag 12 is inflated is covered by the garnish lid 23 by engaging the main body 22 and the garnish lid 23.

FIGS. 7A and 7B correspond to FIG. 5 and illustrate an inflating airbag.

When high-pressure gas is supplied from an inflator to the airbag 12 upon receiving impact in a side collision or a rollover, the airbag 12 starts to inflate. The inflation pressure of the airbag 12 acts upon the lower edge section of the garnish lid 23 (sidewall part 42b of the engaged part 41), causing the garnish lid 23 to be pushed to the inside of the vehicle. As a result, as illustrated in FIG. 7A, the engaged surface 43a of the engagement hole 44 in the engaged part 41 moves over the engagement protrusion 32 of the engagement part 27, causing the engagement part 27 and the engaged part 41 to be disengaged. Consequently, the lower edge section of the garnish lid 23 and the lower edge 24a of the main body 22 detach from each other, and the main body 22 and the garnish lid 23 move apart from each other (see arrow S in FIG. 7), with the attachment pieces 25 secured, forming an opening (inflation opening) K through which the airbag 12 inflates into the vehicle interior (see FIG. 7B).

At this time, the airbag 12 slides along the sidewall part 42b of each engaged part 41 and pushes the garnish lid 23, causing the garnish lid 23 and the main body 22 to detach from each other. Then, the surface of the airbag 12 facing the inside of the vehicle moves over the sidewall part 42b of the engaged part 41 and slides on the chamfered part 47 and then the ceiling part 43. In other words, the airbag 12 is guided toward the opening K by the sidewall part 42b and the chamfered part 47. Meanwhile, the surface of the airbag 12 facing the outside of the vehicle slides on the rib 30 and the longitudinal wall 33 and then moves over the curved surface 33a of the longitudinal wall 33. In this way, the airbag 12 passes through the opening K formed between the main body 22 and the garnish lid 23 and is inflated through the opening K into the vehicle interior.

In this embodiment, the engagement protrusion 32 of the engagement part 27 protrudes in a direction opposite to the airbag 12, and the sidewall part 42b of the engaged part 41 is an inclined surface tilted in the inflation direction T of the airbag 12.

With this configuration, when the airbag 12 inflates through the opening K into the vehicle interior, the airbag 12 is less likely to interfere with the engagement part 27 and the engaged part 41. In this way, the airbag 12 can be smoothly inflated through the opening K between the main body 22 and the garnish lid 23 into the vehicle interior, and thus damage of the airbag 12 can be prevented.

In this embodiment, the longitudinal walls 33, whose height is the same as that of the engagement stop 28 in the Z direction, are disposed along the X direction on both sides of the engagement stop 28, and the end surfaces of the longitudinal walls 33 are the curved surfaces 33a.

With this configuration, since the airbag 12 inflates along the curved surfaces 33a, the tip of the engagement stop 28 is prevented from interfering with the airbag 12, enabling the airbag 12 to inflate smoothly.

By providing the rib 30 on the surface of the engagement stop 28 on the side opposite to the engagement protrusion 32, the airbag 12 inflates along the rib 30 even if the airbag 12 comes into contact with the engagement stop 28 between the longitudinal walls 33, thus reliably preventing interference between the airbag 12 and the engagement stop 28. Since the rib 30 has a curved surface, the airbag 12 can be inflated even more smoothly.

The present invention is not limited to the embodiment described above, and various modifications may be made without departing from the scope of the invention. The configuration of the embodiment described above is only an example, and various modifications may be made.

In the embodiment described above, the engagement parts 27 are disposed on the main body 22, and the engaged parts 41 are disposed on the garnish lid 23. Instead, the engaged parts 41 may be disposed on the main body 22, and the engagement parts 27 may be disposed on the garnish lid 23.

In the embodiment described above, a rear pillar garnish is described. The present invention, however, is not limited thereto and may be applied to, for example, a center pillar garnish.

The number of the engagement parts 27, the engagement holes 44, etc. may be changed appropriately.

In the embodiment described above, the sidewall parts 42 of each engaged part 41 are inclined surfaces. The sidewall parts are not limited thereto and may be, for example, curved surfaces.

In the embodiment described above, the notch 21 is rectangular. Instead, the shape of the notch 21 may be changed appropriately to, for example, a circle.

Obviously, numerous modifications and variations of the present invention are possible in light of the above teachings. It is therefore to be understood that within the scope of the appended claims, the invention may be practiced otherwise than as specifically described herein.

What is claimed is:

1. An engagement structure comprising:
   a garnish main body attached to a pillar of a vehicle on a vehicle interior side and having a notch at an inflation position of an airbag of a curtain airbag apparatus accommodated between the pillar and the garnish main body;
   a garnish lid attached to the garnish main body to cover the notch and to be pushed out into a vehicle interior to form an opening between the garnish main body and the garnish lid when the airbag inflates;
   an engagement stop having an engagement protrusion and disposed on one of the garnish main body and the garnish lid, the engagement protrusion protruding in a direction opposite to the airbag accommodated between the pillar and the garnish main body; and
   an engaged part engaged to the engagement protrusion and disposed on another of the garnish main body and the garnish lid, the engaged part having a guiding surface to guide the airbag during inflation.

2. The engagement structure according to claim 1, wherein a first sidewall part is disposed adjacent to the engagement stop in a first direction orthogonal to an inflation direction of the airbag, and the first sidewall part has an end surface including a curved surface.

3. The engagement structure according to claim 2, wherein the curved surface of the first sidewall part is configured to guide the airbag during inflation.

4. The engagement structure according to claim 3, wherein a second sidewall part is disposed adjacent to the engagement stop in the first direction and has an end surface including a curved surface, and
   wherein the engagement stop is disposed between the first and second sidewall parts in the first direction.

5. The engagement structure according to claim 4, wherein the curved surface of the second sidewall part is configured to guide the airbag during inflation.

6. The engagement structure according to claim 1, wherein a rib is disposed on a surface of the engagement stop facing the airbag and is configured to guide the airbag during inflation.

7. The engagement structure according to claim 6, wherein the engagement protrusion is disposed on an opposite side of the engagement stop to the rib.

8. The engagement structure according to claim 1, wherein the engaged part includes an engagement hole disposed adjacent to the guiding surface, and
   wherein the engagement stop is inserted into the engagement hole when the garnish lid is attached to the garnish main body.

\* \* \* \* \*